(12) United States Patent
Kela et al.

(10) Patent No.: US 10,681,729 B2
(45) Date of Patent: Jun. 9, 2020

(54) NETWORK NODE, USER DEVICE AND METHODS THEREOF

(71) Applicant: Huawei Technologies Co., Ltd., Shenzhen (CN)

(72) Inventors: Petteri Kela, Helsinki (FI); Mario Costa, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/051,068

(22) Filed: Jul. 31, 2018

(65) Prior Publication Data

US 2018/0338324 A1 Nov. 22, 2018

Related U.S. Application Data

(63) Continuation of application No. PCT/EP2016/066667, filed on Jul. 13, 2016.

(51) Int. Cl.
*H04W 74/08* (2009.01)
*H04W 72/04* (2009.01)
(Continued)

(52) U.S. Cl.
CPC .......... *H04W 74/08* (2013.01); *H04L 1/0003* (2013.01); *H04L 5/005* (2013.01); *H04L 5/0037* (2013.01);
(Continued)

(58) Field of Classification Search
None
See application file for complete search history.

(56) References Cited

U.S. PATENT DOCUMENTS

2011/0002415 A1 1/2011 Nakao et al.
2011/0013711 A1 1/2011 Wang et al.
(Continued)

FOREIGN PATENT DOCUMENTS

CN 103458420 A 12/2013
EP 2858398 A1 4/2015
(Continued)

OTHER PUBLICATIONS

"Non-Orthogonal Multiple Access Considerations for NR," 3GPP TSG RAN WG1 #85, Nanjing, China, R1-163993, pp. 1-4, 3rd Generation Partnership Project—Valbonne, France (May 23-17, 2016).
(Continued)

*Primary Examiner* — Scott M Sciacca
(74) *Attorney, Agent, or Firm* — Leydig, Voit & Mayer, Ltd.

(57) ABSTRACT

The present invention relates to a network node and a user device. The network node comprises a transceiver configured to receive a plurality of reference signals associated with a plurality of user devices; a processor configured to group the plurality of user devices into at least one group of user devices based on the plurality of received reference signals, assign radio resources for grant-free data transmission to the group of user devices, compute a receiver filter for the group of user devices based on the plurality of received reference signals and the assigned radio resources; wherein the transceiver is configured to receive a plurality of grant-free data transmissions from user devices in the group of user devices in the assigned radio resources, wherein the processor is configured to separate the grant-free data transmissions from the user devices in the group of user devices based on the computed receiver filter.

17 Claims, 9 Drawing Sheets

(51) Int. Cl.
  *H04L 5/00* (2006.01)
  *H04W 74/04* (2009.01)
  *H04L 1/00* (2006.01)
  *H04W 88/08* (2009.01)
  *H04W 74/00* (2009.01)
  *H04B 7/0452* (2017.01)

(52) U.S. Cl.
  CPC .......... *H04L 5/0044* (2013.01); *H04L 5/0094* (2013.01); *H04W 72/0406* (2013.01); *H04W 74/04* (2013.01); *H04W 88/08* (2013.01); *H04B 7/0452* (2013.01); *H04W 72/042* (2013.01); *H04W 74/006* (2013.01)

(56) References Cited

U.S. PATENT DOCUMENTS

| | | | |
|---|---|---|---|
| 2013/0040689 A1* | 2/2013 | Iwai | H04W 52/16 455/522 |
| 2014/0192767 A1* | 7/2014 | Au | H04W 74/0866 370/330 |
| 2014/0254544 A1 | 9/2014 | Kar Kin Au et al. | |
| 2017/0034845 A1* | 2/2017 | Liu | H04L 1/0003 |
| 2018/0145808 A1* | 5/2018 | Kim | H04B 7/04 |
| 2018/0242309 A1 | 8/2018 | Au et al. | |

FOREIGN PATENT DOCUMENTS

| | | |
|---|---|---|
| EP | 2924904 A1 | 9/2015 |
| JP | 2012222723 A | 11/2012 |
| KR | 20150093841 A | 8/2015 |
| WO | 2009122658 A1 | 10/2009 |

OTHER PUBLICATIONS

Kela et al., "Supporting Mobility in 5G: A comparison between Massive MIMO and Continuous Ultra Dense Networks," IEEE International Conference on Communications (ICC), Kuala Lumpur, Malaysia, Institute of Electrical and Electronics Engineers, New York, New York (May 2016).

"Contention-based non-orthogonal multiple access for UL mMTC," 3GPP TSG RAN WG1 Meeting #85, Nanjing, China, R1-164269, pp. 1-6, 3rd Generation Partnership Project, Valbonne, France (May 23-27, 2016).

* cited by examiner

NETWORK NODE, USER DEVICE AND METHODS THEREOF

CROSS-REFERENCE TO RELATED APPLICATIONS

This application is a continuation of International Application No. PCT/EP2016/066667, filed on Jul. 13, 2016, which is incorporated herein by reference in its entirety.

TECHNICAL FIELD

Embodiments of the present invention relate to a network node and a user device. Furthermore, the present invention also relates to corresponding methods, a computer program, and a computer program product.

BACKGROUND

In typical wireless networks, such as in long-term evolution (LTE), the selection of shared physical channels for uplink (UL) data transmission is based on a scheduling (or grant) mechanism. Such a mechanism takes place at a base station (BS). In particular, a user equipment (UE) sends scheduling requests or grants to the BS on an UL control channel. Upon receiving the scheduling requests or grants, the BS transmits UL grants to the UE on a downlink (DL) control channel indicating the resource allocation for UL data transmission. Such resources may e.g. be time, frequency, code channels, etc. Thereafter, the UE transmit UL data on such granted resources.

In traditional contention based approaches transmission medium access is not controlled and thus transmissions using same physical resources can collide in a way that transmissions cannot be received successfully.

A conventional solution has been proposed which describes a scheme for grant-free UL data transmission. However, this conventional solution is a contention based scheme, similar to that used in IEEE 802.11 standard. In particular, in the conventional solution the network defines the physical resources for contention based UL data transmission in terms of time, frequency and/or code domain. This allows for sending data packets without scheduling and associated allocation signalling latency. However, contention based access schemes are inefficient in terms of usage of physical resources due to the high risk of colliding UL data transmissions. Hence, the conventional solution is not appropriate for users generating high traffic loads.

The limitation of schemes that are based on scheduling or grant request is the large signalling overhead, especially in cases where the UL data transmitted is small. As an example, for data packets as small as 20 bytes, the resources used by typical mechanisms based on scheduling or grant requests is around 30% or even 50%. Another limitation of such schemes is the high latency between the scheduling request and the acknowledged transmissions. For example, in LTE the UE first has to inform network about need for uplink resources by scheduling request in next possible occasion on uplink control channel. Then the UE has to wait for possible uplink allocation. Once the uplink allocation is received, the UE has to still wait for allocated subframe and acknowledgement after the transmission. Reduction of such latencies caused by such scheduling related signalling is critical for delay sensitive communications.

The limitations of contention based solutions are always associated with the high risk of UL data collisions. In case of UL data collision, data cannot be decoded correctly and retransmissions are needed. This increases the latency and makes contention based schemes unattractive for delay sensitive communications. Moreover, contention based mechanisms are inefficient in terms of usage of radio resources since the capacity for UL data transmission needs to be larger than that actually used in order to have a low collision probability. Due to this, contention based mechanisms are best suited for small occasional transmissions.

SUMMARY

An objective of embodiments of the present invention is to provide a solution which mitigates or solves the drawbacks and problems of conventional solutions.

Another objective of embodiments of the present invention is to provide a system and a method for grant-free UL transmissions that overcome the limitation of contention based solutions. This allows for efficient grant-free transmissions regardless of the packet sizes and data loads without decreasing network performance in the wireless communication system.

An "or" in this description and the corresponding claims is to be understood as a mathematical OR which covers "and" and "or", and is not to be understand as an XOR (exclusive OR).

The indefinite article "a" in this disclosure and claims is not limited to "one" and can also be understood as "one or more", i.e., plural.

The above objectives are solved by the subject matter of the independent claims. Further advantageous implementation forms of the present invention can be found in the dependent claims.

According to a first aspect of the invention, the above mentioned and other objectives are achieved with a network node for a wireless communication system, the network node comprising:

a transceiver configured to:
receive a plurality of reference signals associated with a plurality of user devices;
a processor configured to:
group the plurality of user devices into at least one group of user devices based on the plurality of received reference signals,
assign radio resources for grant-free data transmission to the group of user devices,
compute a receiver filter for the group of user devices based on the plurality of received reference signals and the assigned radio resources;
wherein the transceiver is configured to:
receive a plurality of grant-free data transmissions from user devices in the group of user devices in the assigned radio resources,
wherein the processor is configured to:
separate the grant-free data transmissions from the user devices in the group of user devices based on the computed receiver filter.

A number of advantages are provided by a network node according to the first aspect. By grouping user devices into one or more groups and computing the receiver filter, ultra-low collision probability is achieved which provides high spectral efficiency. Further, with grant free transmissions, low latency can be achieved due to lack of scheduling requests and scheduling latencies as in conventional solutions.

In a first possible implementation form of a network node according to the first aspect, the processor is configured to:

determine a first control message for at least one user device of the group of user devices, wherein the first control message indicates the assigned radio resources, wherein the transceiver is configured to:

transmit the first control message to the user device.

The first implementation form provides a signalling mechanism for informing the user device of the indicated assigned radio resources for the grant free transmissions.

In a second possible implementation form of a network node according to the first implementation form of the first aspect or to the first aspect as such, the processor is configured to:

derive location information for the plurality of user devices based on the plurality of received reference signals, group the plurality of user devices based on the derived location information for the plurality of user devices.

The second implementation form enables user device location based grouping. This method of using location information can be used to separate (in the spatial domain) simultaneous grant-free transmissions occurring on the same time-frequency-code resources, and thereby improve spectral efficiency. This is especially the case when line-of-sight propagation between the user devices and the network node is at hand.

In a possible implementation form of a network node according to any of the preceding implementation forms of the first aspect or to the first aspect as such, the processor is configured to:

derive spatial correlation of the plurality of received reference signals, group the plurality of user devices based on the derived spatial correlation.

In this implementation form, by using spatial correlation, the user devices can be spatially grouped. Thereby, transmission collision can be minimized and spectral efficiency further improved. This is especially the case when there are not enough degrees of freedom for serving all active user devices simultaneously in e.g. a multi-user MIMO system.

In a third possible implementation form of a network node according to the first or the second implementation form of the first aspect, the processor is configured to:

determine at least one Modulation and Coding Scheme, MCS, based on the plurality of received reference signals, wherein the transceiver is configured to:

transmit a second control message to the user device, wherein the second control message indicates the MCS to be used by the user device in the grant-free data transmission.

By determining the MCSs to be used by the user devices based on the received reference signals improved spectral efficiency is achieved.

In a fourth possible implementation form of a network node according to the third implementation form of the first aspect, the second control message further indicates a MCS update instruction instructing the user device to update the MCS for the grant-free data transmission.

The fourth implementation form further provides a MCS updating mechanism for adapting the MCS to changing propagation and/or interference conditions. Thereby, improved spectral efficiency is enabled.

In a fifth possible implementation form of a network node according to the third or the fourth implementation form of the first aspect, the second control message further indicates different or multiple MCSs to be used by the user device for different radio resources in the grant-free data transmission.

The fifth implementation form optimizes spectral efficiency by associating different radio resources with different MCSs since the channel conditions and/or interference conditions for different radio resources will be different for the same user device.

In a sixth possible implementation form of a network node according to any of the preceding implementation forms of the first aspect or to the first aspect as such, the processor is configured to:

group at least one user device of the plurality of user devices into at least two different groups of user devices.

The sixth implementation form provides a mechanism for giving different user devices different amount of radio resources. For example, an active user device can be given more radio resource than a user device which is less active. Thereby, improved spectral efficiency is enabled.

In a seventh possible implementation form of a network node according to any of the preceding implementation forms of the first aspect or to the first aspect as such, the processor is configured to:

estimate inter-arrival times for data packets in the plurality of received grant-free data transmissions from the user devices in the group of user devices, re-compute the receiver filter for the group of user device based on the plurality of received reference signals and the estimated inter-arrival times.

The seventh implementation form makes use of estimates of inter-arrival times of received data packets for computing the receiver filter. Thereby, activity levels derived from the estimates of inter-arrival times for the user devices are used in the receiver filter computation for improved spectral efficiency.

In an eight possible implementation form of a network node according to any of the preceding implementation forms of the first aspect or to the first aspect as such, the transceiver is configured to:

receive a plurality of new reference signals associated with the plurality of user devices, wherein the processor is configured to:

re-compute the receiver filter for the group of user devices based on the plurality of received new reference signals.

The eight implementation form uses updated channel state information derived from the new received reference signals for computing the receiver filter. Thereby, improved spectral efficiency is enabled since the receiver filter is adapted to changing propagation and/or interference conditions.

In a ninth possible implementation form of a network node according to any of the preceding implementation forms of the first aspect or to the first aspect as such, transceiver is configured to:

receive a plurality of new reference signals associated with the plurality of user devices, wherein the processor is configured to:

re-group the plurality of user devices into at least one new group of user devices based on the plurality of received new reference signals.

The ninth implementation form provides a mechanism for grouping which considers the movement of the user devices. Thereby, improving spectral efficiency is enabled.

In a tenth possible implementation form of a network node according to any of the preceding implementation forms of the first aspect or to the first aspect as such, wherein assigned radio resources for different groups of user devices are orthogonal to each other.

The tenth implementation form reduces or fully removes inter-group interference by the use of orthogonal radio resources for different groups.

According to a second aspect of the invention, the above mentioned and other objectives are achieved with a user device for a wireless communication system, the user device comprising
a transceiver configured to:
 transmit at least one reference signal to a network node,
 receive a first control message from the network node, wherein the first control message indicates radio resources for grant-free data transmission,
 receive a second control message from the network node, wherein the second control message indicates at least one MCS associated with the indicated radio resources,
 transmit data packets to the network node in the indicated radio resources for grant-free data transmission using the indicated MCS.

A number of advantages are provided by a user device according to the second aspect. The user device according to the second aspect enable grant free transmissions implying low latency due to lack of scheduling request and scheduling latencies. Further, transmission in the indicated radio resources will lead to coordinated interference. By transmitting in the indicated MCS improved spectral efficiency is also enabled.

In a first possible implementation form of a user device according to the second aspect, the second control message further indicates a MCS update instruction instructing the user device to update the MCS for the grant-free data transmission, wherein the transceiver is configured to:
 transmit data packets to the network node in the indicated radio resources using the another MCS.

The first implementation form further provides a MCS updating mechanism for adapting to changing propagation and/or interference conditions. Thereby, improved spectral efficiency is enabled.

In a second possible implementation form of a user device according to the first possible implementation form of the second aspect or to the first aspect as such, the second control message further indicates different or multiple MCSs to be used by the user device for different radio resources in the grant-free data transmission,
 wherein the transceiver is configured to:
 transmit data packets to the network node in the indicated radio resources using the MCSs for different radio resources.

The second implementation form optimize spectral efficiency by associating different radio resources to different MCSs since the channel conditions for different radio resources will be different for the same user device.

According to a third aspect of the invention, the above mentioned and other objectives are achieved with a method comprising:
 receiving a plurality of reference signals associated with a plurality of user devices, grouping the plurality of user devices into at least one group of user devices based on the plurality of received reference signals,
 assigning radio resources for grant-free data transmission to the group of user devices,
 computing a receiver filter for the group of user devices based on the plurality of received reference signals and the assigned radio resources,
 receiving a plurality of grant-free data transmissions from user devices in the group of user devices in the assigned radio resources,
 separating the grant-free data transmissions from the user devices in the group of user devices based on the computed receiver filter.

In a first possible implementation form of a method according to the third aspect, the method comprising:
 determining a first control message for at least one user device of the group of user devices, wherein the first control message indicates the assigned radio resources,
 transmitting the first control message to the user device.

In a second possible implementation form of a method according to the first implementation form of the third aspect or to the third aspect as such, the method comprising:
 deriving location information for the plurality of user devices based on the plurality of received reference signals,
 grouping the plurality of user devices based on the derived location information for the plurality of user devices.

In a possible implementation form of a method according to any of the preceding implementation forms of the third aspect or to the third aspect as such, the method comprising:
 deriving spatial correlation of the plurality of received reference signals,
 grouping the plurality of user devices based on the derived spatial correlation.

In a third possible implementation form of a method according to the first or the second implementation form of the third aspect, the method comprising:
 determining at least one Modulation and Coding Scheme, MCS, based on the plurality of received reference signals,
 transmitting a second control message to the user device, wherein the second control message indicates the MCS to be used by the user device in the grant-free data transmission.

In a fourth possible implementation form of a method according to the third implementation form of the third aspect, the second control message further indicates a MCS update instruction instructing the user device to update the MCS for the grant-free data transmission.

In a fifth possible implementation form of a method according to the third or the fourth implementation form of the third aspect, the second control message further indicates different or multiple MCSs to be used by the user device for different radio resources in the grant-free data transmission.

In a sixth possible implementation form of a method according to any of the preceding implementation forms of the third aspect or to the third aspect as such, the method comprising:
 grouping at least one user device of the plurality of user devices into at least two different groups of user devices.

In a seventh possible implementation form of a method according to any of the preceding implementation forms of the third aspect or to the third aspect as such, the method comprising:
 estimating inter-arrival times for data packets in the plurality of received grant-free data transmissions from the user devices in the group of user devices,
 re-computing the receiver filter for the group of user device based on the plurality of received reference signals and the estimated inter-arrival times.

In an eight possible implementation form of a method according to any of the preceding implementation forms of the third aspect or to the third aspect as such, the method comprising:
 receiving a plurality of new reference signals associated with the plurality of user devices,
 re-computing the receiver filter for the group of user devices based on the plurality of received new reference signals.

In a ninth possible implementation form of a method according to any of the preceding implementation forms of the third aspect or to the third aspect as such, the method comprising:

receiving a plurality of new reference signals associated with the plurality of user devices, re-grouping the plurality of user devices into at least one new group of user devices based on the plurality of received new reference signals.

In a tenth possible implementation form of a method according to any of the preceding implementation forms of the third aspect or to the third aspect as such, wherein assigned radio resources for different groups of user devices are orthogonal to each other.

According to a fourth aspect of the invention, the above mentioned and other objectives are achieved with a method comprising:

transmitting at least one reference signal to a network node, receiving a first control message from the network node, wherein the first control message indicates radio resources for grant-free data transmission, receiving a second control message from the network node, wherein the second control message indicates at least one MCS associated with the indicated radio resources, transmitting data packets to the network node in the indicated radio resources using the indicated MCS.

In a first possible implementation form of a method according to the fourth aspect, the second control message further indicates a MCS update instruction instructing to update the MCS for the grant-free data transmission, the method comprising:

transmitting data packets to the network node in the indicated radio resources using the another MCS.

In a second possible implementation form of a method according to the first possible implementation form of the fourth aspect or to the fourth aspect as such, the second control message further indicates different or multiple MCSs to be used for different radio resources in the grant-free data transmission, the method comprising:

transmitting data packets to the network node in the indicated radio resources using the MCSs for different radio resources.

The advantages of any method according to the third or fourth aspect is the same as those for the corresponding network node or user device according to the first or second aspect.

Embodiments of the invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Embodiments of the invention relate to a network node, a user device and corresponding methods which make it possible for user devices to transmit in a grant-free manner and without resorting to contention based transmissions.

Figure 1:
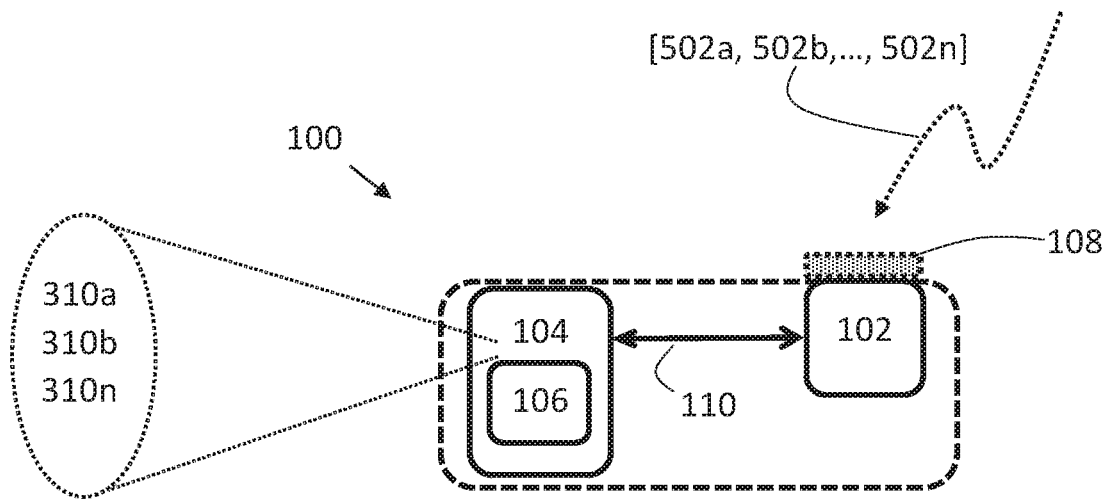
FIG. 1 shows a network node according to an embodiment of the invention.

FIG. 1 shows a network node 100 according to an embodiment of the invention. The network node 100 comprises a transceiver 102 communicably coupled to a processor 104 with communication means 110 illustrated with the arrow in FIG. 1. The network node 100 in this embodiment further comprises an antenna 106 configured for wireless communications in a wireless communication system 500, such as e.g. LTE. The antenna may e.g. be a multi-user multiple input multiple output (MU-MIMO) capable antenna array.

Figure 5:
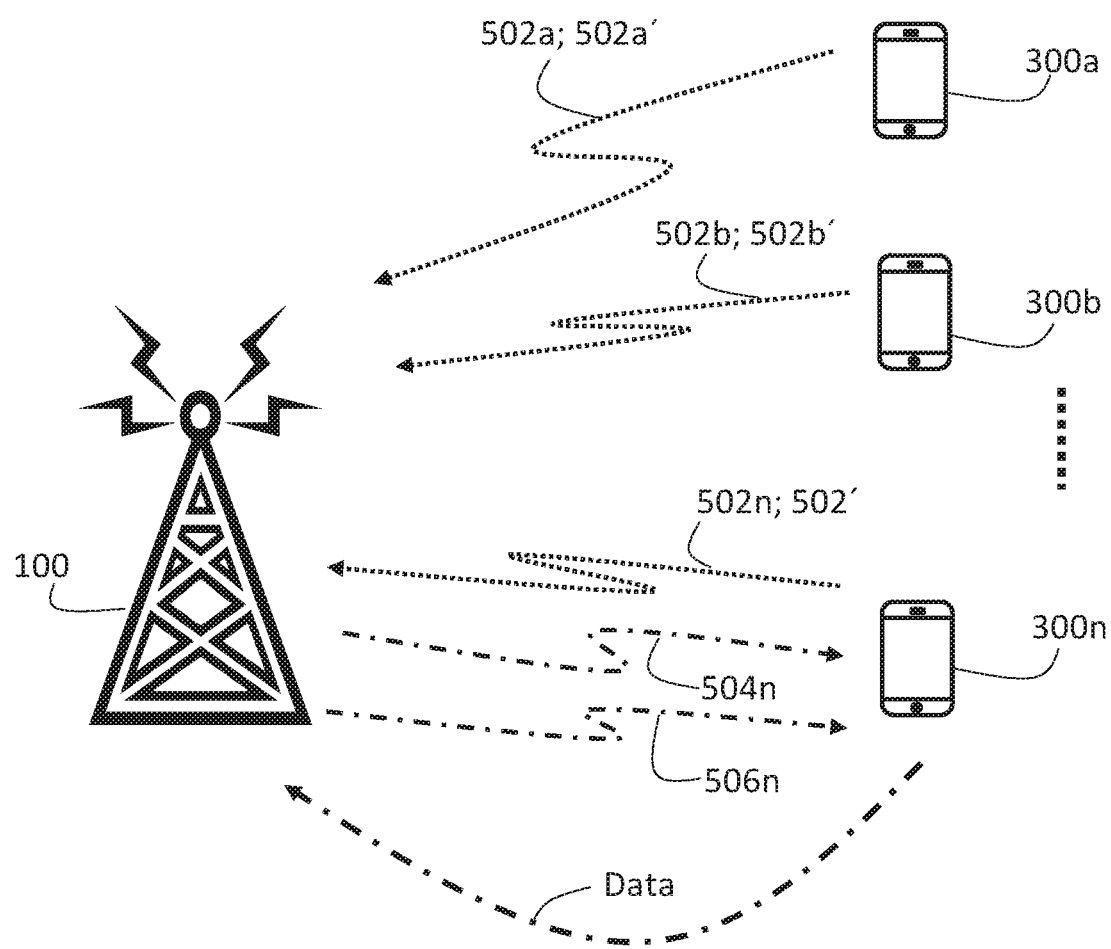
FIG. 5 illustrates embodiments of the invention in a wireless communication system.

According to the present solution, the transceiver 102 of the network node 100 is configured to receive a plurality of reference signals $502a, 502b, \ldots, 502n$ associated with a plurality of user devices $300a, 300b, \ldots, 300n$ (see FIG. 5). The processor 104 of the network node 100 is configured to group the plurality of user devices $300a, 300b, \ldots, 300n$ into at least one group of user devices $310n$ based on the plurality of received reference signals $502a, 502b, \ldots, 502n$. The processor 104 is further configured to assign radio resources for grant-free data transmission to the group of user devices $310n$. The processor 104 is further configured to compute a receiver filter 106 for the group of user devices $310n$ based on the plurality of received reference signals $502a, 502b, \ldots, 502n$ and the assigned radio resources. The transceiver 102 is further configured to receive a plurality of grant-free data transmissions from user devices $300n$ in the group of user devices $310n$ in the assigned radio resources. The processor 104 is further configured to separate the grant-free data transmissions from the user devices $300n$ in the group of user devices based on the computed receiver filter 106. It is illustrated in FIG. 1 how the processor 104 can group the user devices into one or more groups of user devices $310a, 310b, \ldots, 310n$.

Figure 2:
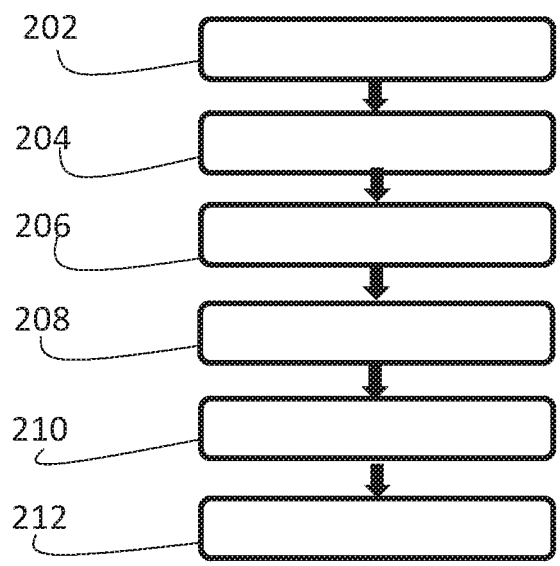
FIG. 2 shows a flow chart of a method according to an embodiment of the invention.

FIG. 2 shows a corresponding method 200 according to an embodiment of the invention which may be executed in a network node 100, such as the one shown in FIG. 1. The method 200 comprises receiving 202 a plurality of reference signals $502a, 502b, \ldots, 502n$ associated with a plurality of user devices $300a, 300b, \ldots, 300n$. The method 200 further comprises grouping 204 the plurality of user devices $300a, 300b, \ldots, 300n$ into at least one group of user devices $310n$ based on the plurality of received reference signals 502a, 502b, . . . , 502n. The method 200 further comprises assigning 206 radio resources for grant-free data transmission to the group of user devices 310n. The method 200 further comprises computing 208 a receiver filter 106 for the group of user devices 310n based on the plurality of received reference signals 502a, 502b, . . . , 502n and the assigned radio resources. The method 200 further comprises receiving 210 a plurality of grant-free data transmissions from user devices 300n in the group of user devices 310n in the assigned radio resources. The method 200 further comprises separating 212 the grant-free data transmissions from the user devices 300n in the group of user devices based on the computed receiver filter 106.

A network node 100 described herein may also be denoted as an access node or an access point or a base station, e.g., a Radio Base Station (RBS), which in some networks may be referred to as transmitter, "eNB", "eNodeB", "NodeB", "gNB" or "B node", depending on the technology and terminology used. The access network nodes may be of different classes such as, e.g., macro eNodeB, home eNodeB or pico base station, based on transmission power and thereby also cell size. The access network node can be a Station (STA), which is any device that contains an IEEE 802.11-conformant Media Access Control (MAC) and Physical Layer (PHY) interface to the Wireless Medium (WM). The access network node 300a, 300b may also be a network node in a wired communication system. Further, standards promulgated by the IEEE, the Internet Engineering Task Force (IETF), the International Telecommunications Union (ITU), the 3GPP standards, fifth-generation (5G) standards and so forth are supported. In various embodiments, the network node 400 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs, and/or 3GPP LTE standards. The access network node 300a, 300b may communicate information according to one or more of the Digital Video Broadcasting Terrestrial (DVB-T) broadcasting standard and the High performance radio Local Area Network (HiperLAN) standard.

In an embodiment, the processor 104 of the network node 100 is configured to determine a first control message 504n for at least one user device 300n in the group of user devices 310n. The first control message 504n indicates the assigned radio resources for grant-free transmissions. The transceiver 102 is further configured to transmit the first control message 504n to the user device 300n. Hence, this embodiment relates to signalling the assigned radio resources to the user devices for grant-free transmission.

In an embodiment it is assumed that each user device 300 transmit UL reference signal periodically to the network node 100, e.g. by transmitting so called beacon signals. Such UL reference signals are transmitted on physical resources, and they are non-overlapping (i.e. orthogonal) among the user devices 300a, 300b, . . . , 300n. These UL reference signals are used for acquiring the channel state information at the transmitter (CSIT). Alternatively, such UL reference signals may be used to estimate and track the positions of the user device 300n to derive location information. The UL reference signals are assigned in a manner that up-to-date CSIT or rough position estimate can be assumed whenever the user device 300n transmits grant-free UL data.

In particular, the network node 100 may estimate and track the channels and/or positions of a user device 300n from the periodically transmitted UL reference signals. This allows the network node 100 to calculate the receiver filter weights for its MU-MIMO capable antenna array in a way that the network node 100 can receive user device transmissions sent on the same time and frequency resources as long as the channels and/or positions of the user device 300n are different, Hence, UL transmissions from multiple user devices can be spatially separated and received in an error-free manner.

In order to further reduce the control signalling, a robust modulation and coding scheme (MCS) can be used by default for UL grant-free transmissions by the user device 300. However, in order to optimize the overall performance of proposed scheme, the network node 100 can update the MCS individually for the user devices and further re-update when the network node 100 detects that the signal-to-interference-plus-noise ratio (SINR) used for determining the MCS is outdated.

In a further embodiment, the processor 104 is further configured to determine at least one MCS based on the plurality of received reference signals 502a, 502b, . . . , 502n. Further, the transceiver 102 is configured to transmit a second control message 506n to the user device 300n. The second control message 506n indicates the MCS to be used by the user device 300n in the grant-free data transmission.

The first control message 504n and the second control message 506n are in one embodiment transmitted in different time instances. In another embodiment, the first control message 504n and the second control message 506n are transmitted in the same time instances, e.g. in the same control signal.

In an embodiment, the second control message 506n further indicates a MCS update instruction instructing the user device 300n to update the MCS for the grant-free data transmission. Thereby, an MCS update mechanism is provided.

In an embodiment, the second control message 506n further indicates different or multiple MCSs to be used by the user device 300n for different radio resources in the grant-free data transmission.

Figure 3:
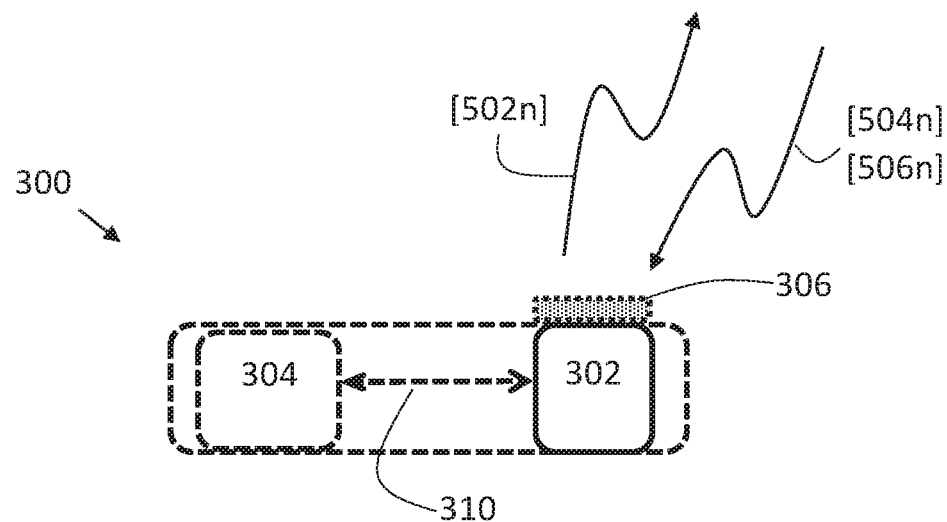
FIG. 3 shows a user device according to an embodiment of the invention.

FIG. 3 shows a user device 300 according to an embodiment of the invention. The user device 300 comprises a transceiver 302 communicably coupled to a processor 304 with communication means 310 illustrated with the arrow in FIG. 1. The user device 300 in this embodiment further comprises an antenna 306 configured for wireless communications in a wireless communication system 500.

According to the present solution the transceiver 302 of the user device 300 is configured to transmit at least one reference signal 502n to a network node 100. The transceiver 302 is further configured to receive a first control message 504n from the network node 100. The first control message 504n indicates radio resources for grant-free data transmission. The transceiver 302 is further configured to receive a second control message 506n from the network node 100. The second control message 506n indicates at least one MCS associated with the indicated radio resources. The transceiver 302 is further configured to transmit data packets to the network node 100 in the indicated radio resources for grant-free data transmission using the indicated MCS.

Figure 4:
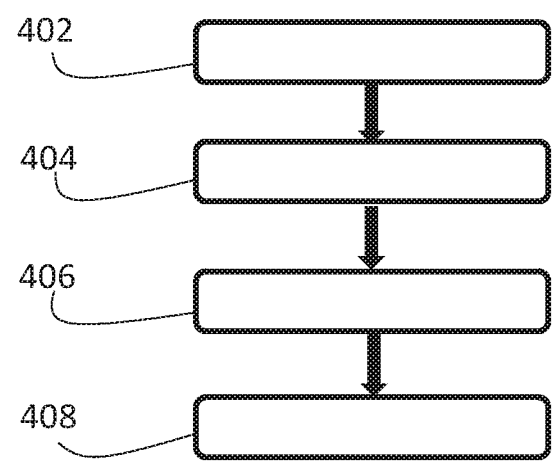
FIG. 4 shows a flow chart of a method according to an embodiment of the invention.

FIG. 4 shows a corresponding method 400 according to an embodiment of the invention which may be executed in a user device 300, such as the one shown in FIG. 3. The method 400 comprises transmitting 402 at least one reference signal 502n to a network node 100. The method 400 further comprises receiving 404 a first control message 504n from the network node 100, wherein the first control message 504n indicates radio resources for grant-free data transmission. The method 400 further comprises receiving 406 a second control message from the network node 100, wherein the second control message 506n indicates at least one MCS associated with the indicated radio resources. The method 400 further comprises transmitting 408 data packets to the network node 100 in the indicated radio resources using the indicated MCS.

A user device 300 described herein may be any of a User Equipment (UE), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). Further, standards promulgated by the IEEE, the Internet Engineering Task Force (IETF), the International Telecommunications Union (ITU), the 3GPP standards, fifth-generation (5G) standards and so forth, are supported. In various embodiments, the receiving device 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs, and/or 3GPP LTE standards. The receiving device 100 may communicate information according to one or more of the Digital Video Broadcasting Terrestrial (DVB-T) broadcasting standard and the High performance radio Local Area Network (HiperLAN) standard.

In order to accommodate high user device densities with respect to the available degrees of freedom at the network side, the user devices 300a, 300b, . . . , 300n are divided into separate groups of user devices 310a, 310b, . . . , 310n. These groups may be assigned non-overlapping time or frequency or code resource blocks for grant-free UL transmissions. However, within each group the user devices of the same group share such resource blocks. It is to be noted that at least one user device 300 can be assigned to two or more groups. For example, various scheduling metrics can be used for user grouping. These metrics can be e.g. spatial orthogonality between users, past average user throughputs, SINR estimations, time since last Channel State Information (CSI) measurement, etc.

As aforementioned, one such metric is based on the plurality of received reference signals 502a, 502b, . . . , 502n. Based on may imply an number of alternatives. One example is all aspects related to signal strength and interference. Other examples may relate to location and spatial correlation which e.g. may be derived from the received reference signals 502a, 502b, . . . , 502n.

Accordingly, in one embodiment the processor 104 of the network node 100 is configured to derive location information for user devices 300a, 300b, . . . , 300n based on the plurality of received reference signals 502a, 502b, . . . , 502n. The processor 104 is further configured to group the plurality of user devices 300a, 300b, . . . , 300n based on the derived location information for the plurality of user devices 300a, 300b, . . . , 300n.

Accordingly, in another embodiment the processor 104 of the network node 100 is configured to derive spatial correlation of the plurality of received reference signals 502a, 502b, . . . , 502n and group the user devices 300a, 300b, . . . , 300n based on the derived spatial correlation.

FIG. 5 illustrates the present solution in a wireless communication system 500. A network node 100 receives reference signals 502a, 502b, . . . , 502n associated with user devices 300a, 300b, . . . , 300n. The network node 100 groups the user devices 300a, 300b, . . . , 300n based on the received reference signals 502a, 502b, . . . , 502n. Thereafter, the network node 100 assigns radio resources and computes one or more receiver filters 106. It is further illustrated in FIG. 5 how the network node 100 transmits a first control message 504n and a second control message 506n to user device 300n. At the reception of the first control message 504n and the second control message 506n, the user device 300n transmits in a grant-free manner in the uplink (UL) to the network node 100. The grant-free transmission is performed in the radio resource indicated in the first control message 504n. The grant-free transmission is further performed in the MCS(s) indicated in the second control message 504n.

Figure 6:
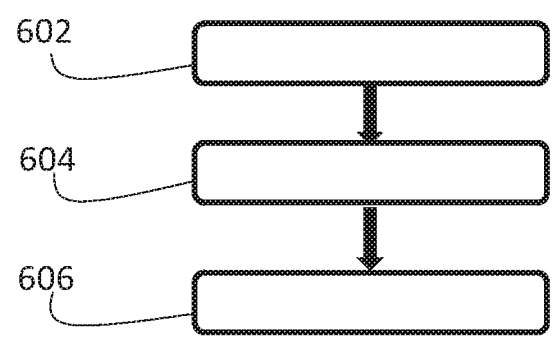
FIG. 6 shows a flow chart of an embodiment of the invention.

FIG. 6 shows a flow chart of an embodiment of the invention in which user devices are grouped into different groups. At step 602, the network node 100 generates a list of potentially active user devices that may transmit UL data. At step 604, the network node 100 groups the potentially active user devices into one or more groups. If the network node 100 can support all potentially active user devices one group could be enough. Otherwise the network node 100 groups the potentially active user devices into a plurality of groups. At step 606, the network node 100 assigns orthogonal radio resources to the different groups. The orthogonal radio resources may be non-overlapping time, frequency, code, etc. The radio resources within the same group are however not orthogonal.

Figure 7:
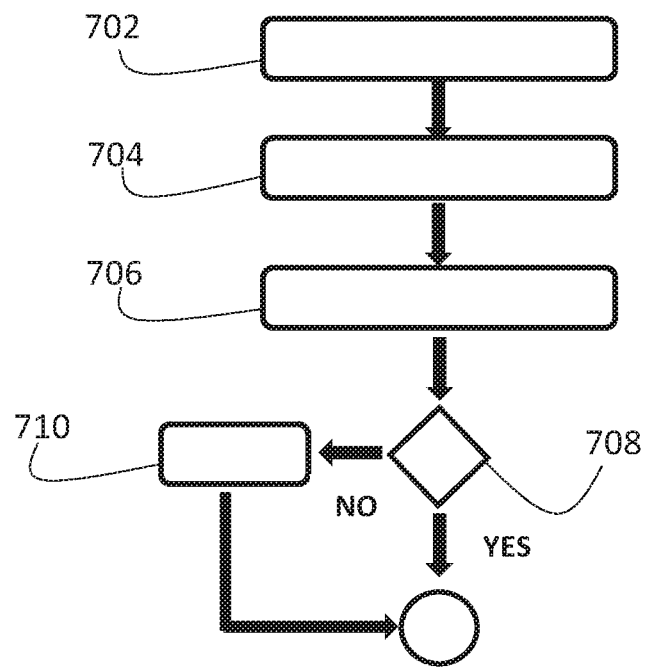
FIG. 7 shows a flow chart of an embodiment of the invention.

FIG. 7 illustrates mechanisms for receiver filter re-computation and MCS index update procedure at the network node 100. At step 702, the network node 100 receives new reference signals 502a', 502b', . . . , 502n' from the user devices (see also FIG. 5). Based on the new reference signals 502a', 502b', . . . , 502n' the network node 100 may re-group the user devices into a new constellation of groups of user devices. At step 704, the network node 100 re-computes the receiver filter for each group. At step 706, the network node 100 estimates the SNIRs for all user devices in a group. At step 708, the network node 100 checks if the MCSs signaled to the user devices in the group still are valid based on the estimated SNRs. If the already signaled MCSs are valid no further action is performed, i.e. YES in FIG. 7. However, if the already signaled MCSs are not valid, i.e. NO in FIG. 7, the network node 100 at step 710 updates the MCSs for the user devices in the group and signals the updated MCSs to the user devices in second control messages (not shown in FIG. 7).

As illustrated in FIG. 7, step 704 is triggered by the step 702, i.e. when a new CSIT is acquired (e.g. uplink pilot signal is measured), or the position of the user devices is updated, or the user device(s) are removed or added to a group, the network node 100 re-computes the multi-antenna receiver filters at step 704. The receiver filters are for receiving signals of interest in a spatially selective way in the presence of interference and noise. The receiver filter updates are done for each user group separately. Once the multi-antenna receiver filters are computed by network node 100, the SINR estimates are updated for all user devices at step 706. At step 708, if the newly calculated SINR estimate for a given user device leads to an MCS value that is significantly different from that used by the user device, the network node 100 transmits an updated MCS instruction (e.g. an update index) on a DL control channel to the user device in order to be used by the user device for subsequent grant free UL data transmissions.

Accordingly, in an embodiment the transceiver 102 of the network node 100 is configured to receive a plurality of new reference signals 502$a'$, 502$b'$, . . . , 502$n'$ associated with a plurality of user devices 300$a$, 300$b$, . . . , 300$n$. Further, the processor 104 of the network node 100 is configured to re-compute the receiver filter 106 based on the plurality of received new reference signals 502$a'$, 502$b'$, . . . , 502$n'$.

In a further embodiment, the transceiver 102 of the network node 100 is configured to receive a plurality of new reference signals 502$a'$, 502$b'$, . . . , 502$n'$ associated with a plurality of user devices 300$a$, 300$b$, . . . , 300$n$. Further, the processor 104 of the network node 100 is configured to re-group the plurality of user devices 300$a$, 300$b$, . . . , 300$n$ into at least one new group of user devices 310$n$ based on the plurality of received new reference signals 502$a'$, 502$b'$, . . . , 502$n'$.

Some further comments to FIG. 7 is hereby presented. Firstly, it is assumed that active user devices transmit UL reference signals periodically so that the network node can keep track of the MIMO channels and/or the position of the user device. Secondly, the network node procedures shown in FIG. 7 can be performed by a base station or at other network device that control the base station(s) within the network, e.g. a control device such as a radio network controller. Finally, the embodiment in FIG. 7 assumes a "worst-case" scenario since it is assumed that all UEs within a group can transmit simultaneously when calculating the receiver filters as well as in estimating the SINRs for selecting the MCS.

Aforementioned, it is possible to assign a user device 300 to multiple groups simultaneously. This means that the user device 300 assigned to multiple groups can utilize radio resources assigned for multiple groups for sending grant-free UL transmissions. However, the network node 100 thus has to calculate separate user specific MCS for each group the user device 300 is assigned to. The user device 300 can either be configured dynamically by means of control signalling or assigned e.g. with an RRC signalling to use predefined radio resources with predefined group indexes. Then only UL group index (or indexes) corresponding to allocated radio resources can be signalled to UEs.

Figure 8:
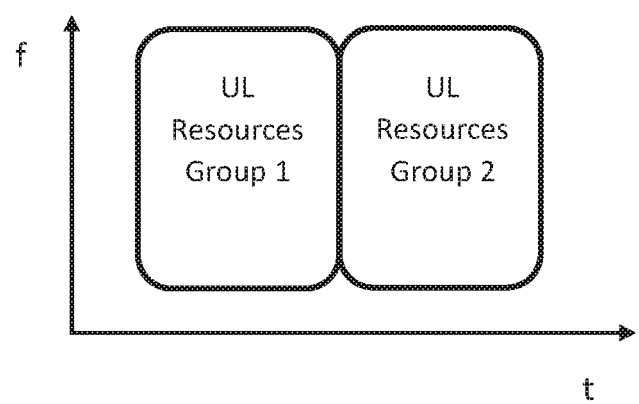
FIG. 8 illustrates orthogonal radio resources for two different groups of user devices.

A simplified example of physical resource allocation is illustrated in FIG. 8. As shown in the example in FIG. 8 there are two groups of user devices which are assigned orthogonal radio resources since they are allowed transmit at different time instances.

In an embodiment, the network node 100 estimates the UL packet inter-arrival times for each user device 300. Thus, the network node 100 is able to optimize the receiver filters and SINR estimates given that it can successfully predict the time periods when the user devices are most probably not transmitting. To increase predictability, it is also possible to force user devices to use only certain time windows by assigning semi-persistent UL transmission windows for individual user devices.

Figure 9:
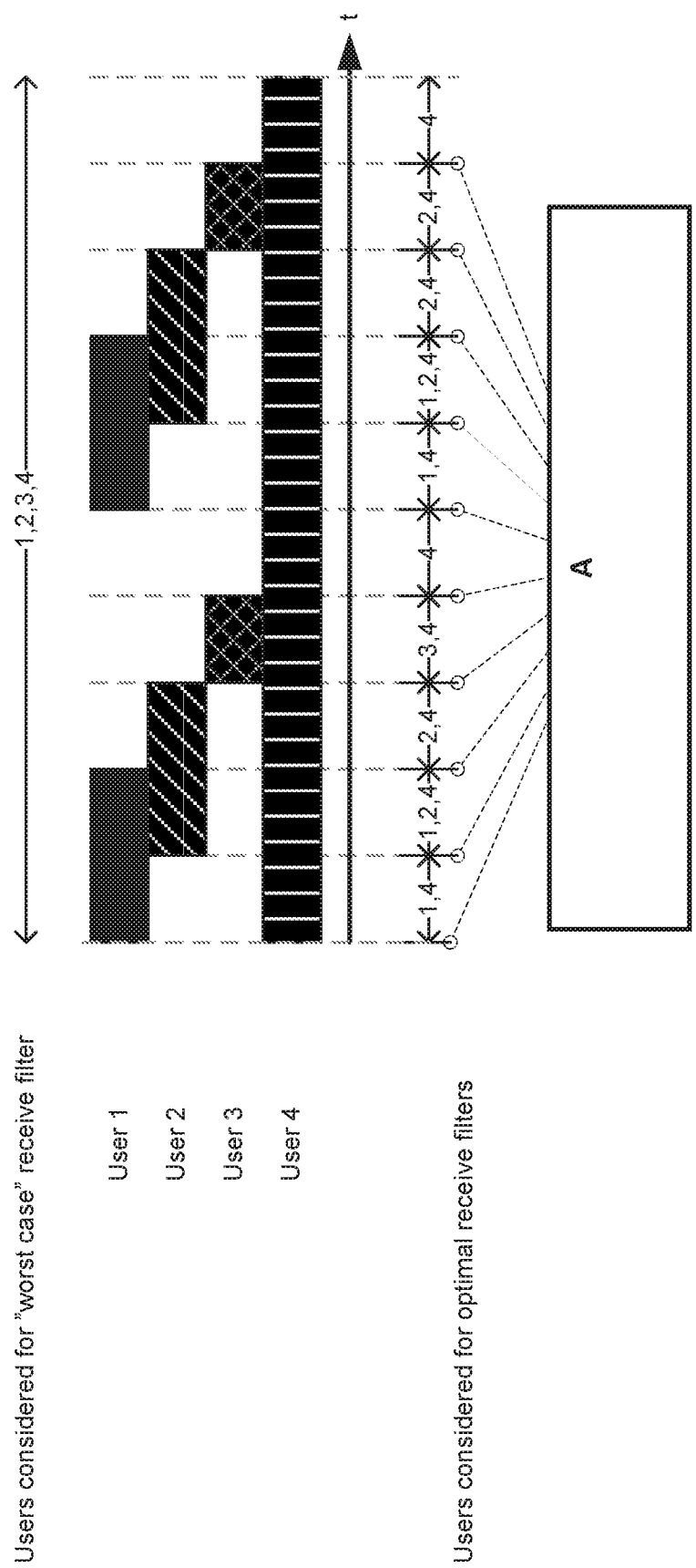
FIG. 9 illustrates receiver filter optimization.

In FIG. 9, receiver filter calculation optimization is illustrated by showing the UL transmission time windows for users 1, 2, 3 and 4 (using the same frequency). Such UL transmissions are inferred by the network node by estimating the inter-arrival times of the data packets. In processing box A in FIG. 9 both the receiver filter and MCSs are updated at the time slot edges. This allows for calculating optimal MCSs for user devices at each time periods. However, in order to gain from this procedure, the network node 100 needs to indicate new MCSs for user devices whenever the receiver filters change. This can be done in a way that e.g. different MCS values are given for each time slot for each user device. The MCSs are either updated by a DL control signal or independently by the user device 300 from a pre-assigned MCS allocation table. For example, if there are N time slots in certain time period, it is possible to assign N different MCSs for that time period. If it is assumed that SINR estimates for user devices are changing significantly when different receiver filters are applied, then the MCS should be changed as well in order to reach optimal performance. In FIG. 9, it can be seen that user 4 needs to be assigned 5 different MCSs for 5 adjacent time slots in order to optimize the corresponding receiver filters. If channels do not age significantly during these 5 time slots, then SINR estimations do not change and user 4 can reuse the same MCS allocation again. Thus, a change is not needed. It can be also seen that user 3 would reach optimal performance with just 1 MCS value. Users 1 and 2 would need both 2 MCS values. As mentioned before, it is also possible to assign just single MCSs for each user device according to worst case scenario (i.e. every user is assumed to transmit at the same time), if less MCS indication signalling is desired. To optimize performance, receiver filters have to be updated for each different set of user devices. This also causes SINRs experienced by user devices to vary, which means that most probably different MCS is required for each different set of user devices in receiver filters. This means that multiple MCSs are needed for each user device 300 if performance maximization is the goal. Another option is to use only single ("worst case") receiver filter to minimize MCS updates.

It should be noted that network node 100 can also apply several receiver filters, i.e. calculate several receiver filter options by using different combinations of possibly transmitting users, for received signals and use the optimal receiver filter. However, the problem is that the user device 300 is agnostic to this process and the MCS has therefore to be indicated to the user device 300 beforehand. To trade-off between reliability and performance MCS selection can be either pessimistic or optimistic with respect to SINR estimation and estimated channel aging caused by e.g. user mobility. Channel aging most probably leads to lower SINR for actual transmission that estimated from pilots sent some time before.

Figure 10:
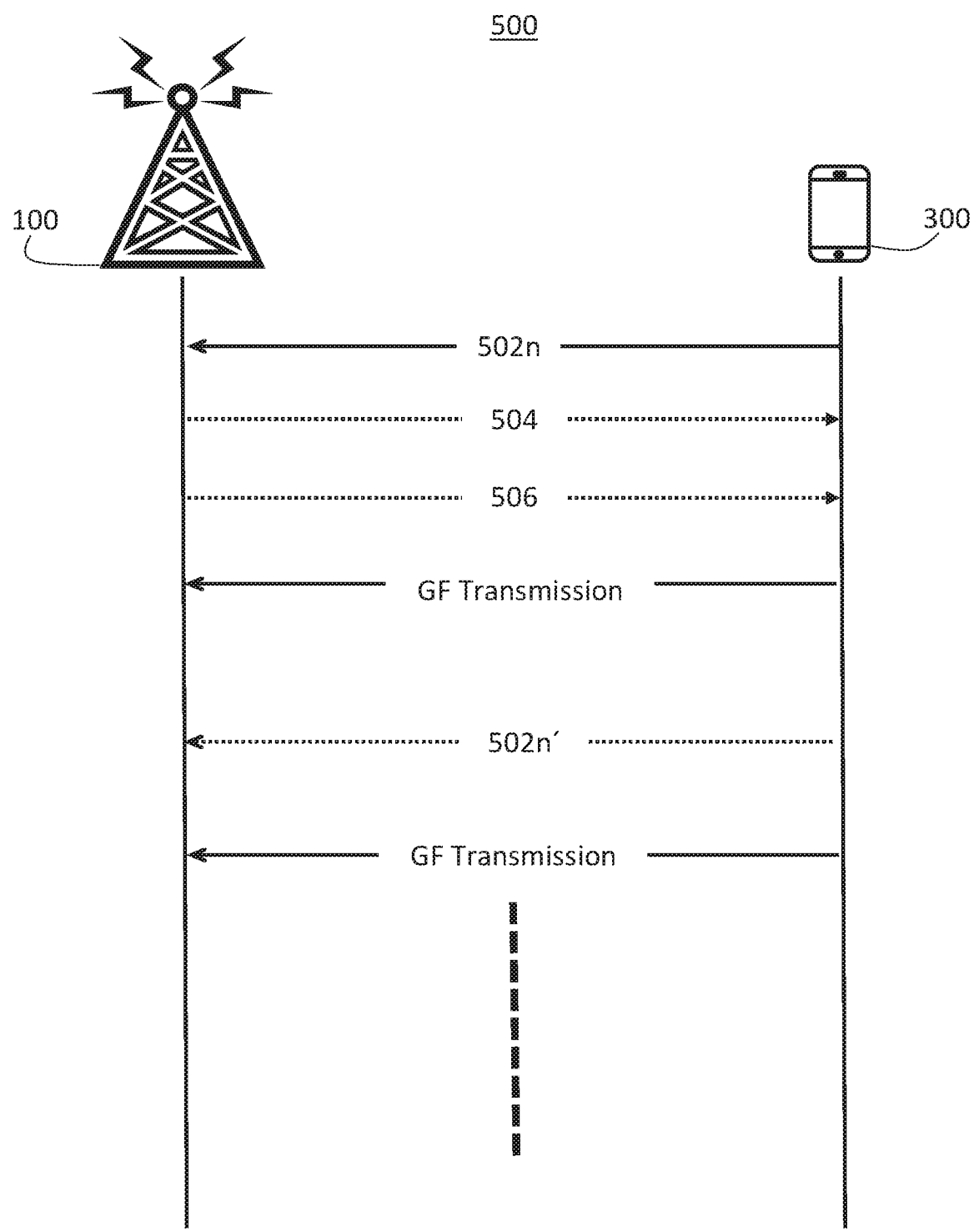
FIG. 10 illustrates signalling aspects of embodiments of the invention.

FIG. 10 illustrates some further important signalling aspects of the invention. A network node 100 receives reference signals 500$n$ from a user device 300. According to embodiments the network node 100 transmits a first control message 504 and a second control message 506 to the user device 300. The content of mentioned control messages 504 and 506 have previously been described. The user device 300 performs grant-free (GF) transmissions according to the first and second control messages 504 and 506, respectively. The user device 300 continues to transmit reference signals, denoted as new reference signals 502$n'$ in FIG. 10. Based on the new reference signals 502$n'$ the network node 100 may re-group the user device 300, re-compute the receiver filter 106, re-compute the MCS(s), etc. The updating and feedback mechanism illustrated in FIG. 10 may continue as long as the user device 300 is active.

The effects of embodiments of the invention is that active user devices are able to send their UL data without scheduling and grant signalling burden. User devices can independently utilize available UL radio resources as they see best, meaning that transmissions can start and stop, e.g. at any OFDM symbol. Moreover, contention based schemes are not needed nor required in the present solution which results in improved spectral efficiency in the wireless communication system 500 compared to conventional solutions.

Effectiveness of the present solution was also proved with dynamic 5G TDD system level simulator. The simulator was modelling ultra-dense network, which consist of network nodes (or base stations) with 20 antennas each. 1000 users/km² density with user devices moving 50 km/h was assumed. Split between DL and UL resources was 50-50 for easier performance comparison between DL and UL. In the simulations, the same physical resources for UL transmission were assigned to all user devices within the simulation area. All user devices were active and thus sending UL reference signals in the form of pilots. The network was using such pilot transmissions for keeping channel state information up-to-date for all user devices. Network nodes were independently updating their receiver filters every time new channel measurements were available. SINRs estimates were updated every time the receiver filters were re-calculated and MCSs were signalled to user devices if SINR estimates changed significantly. To simulate worst case scenario, all user devices were sending UL data all the time with full buffer.

Figure 11:
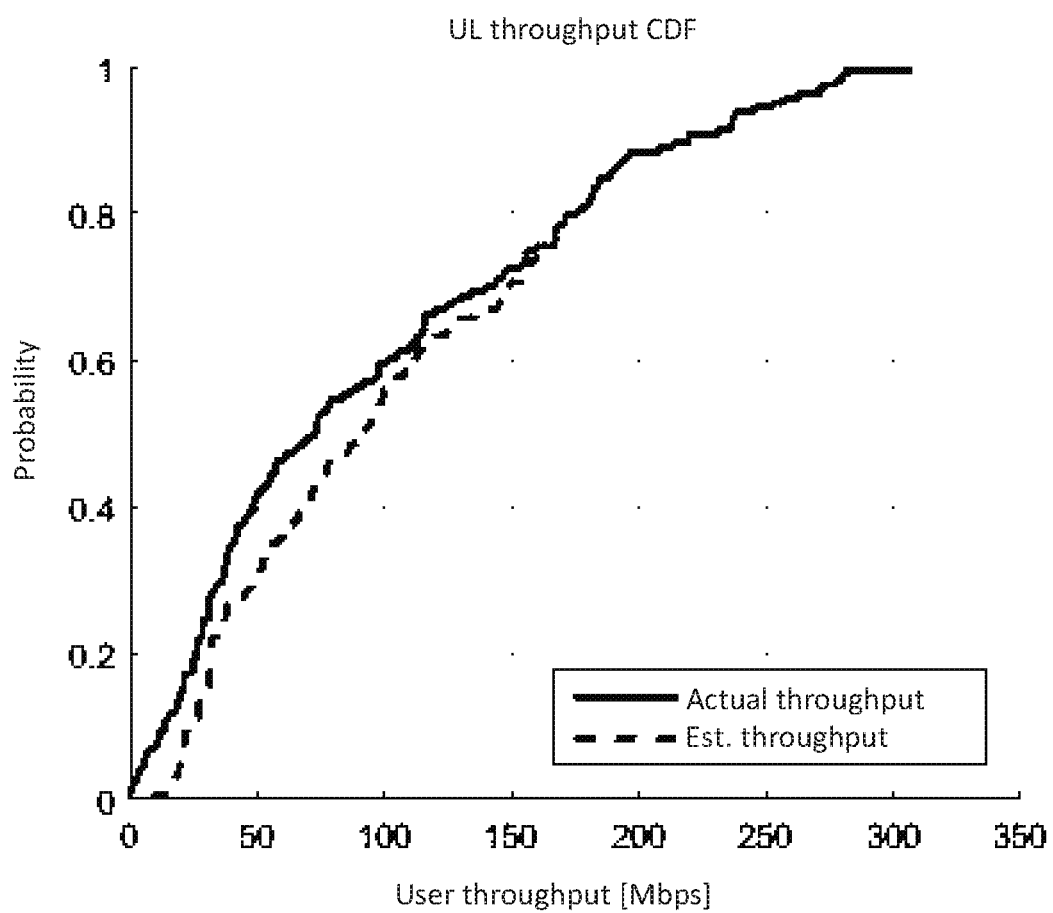
FIG. 11 shows performance results of embodiments of the invention.

The performance result of the simulation study as described above is shown FIG. 11 in UL throughput CDF. The X-axis in FIG. 11 shows user throughput in Mbps and the Y-axis in FIG. 11 shows the probability. It can be seen in FIG. 11 that the present solution works well. Only 1% of users were experiencing total outage of uplink transmissions during the simulations. However, it has to be remembered that in reality data traffic has bursty nature, which would reduce amount of simultaneous transmissions and thus reduce interference. Further, by grouping user devices and assigning separate time or frequency or code resources for separate groups of user devices, interference could be reduced to enable more uniform throughput distribution. The worst case performance of proposed grant free uplink solution in 5G ultra-dense network with users moving 50 km/h. It should further be noted that performance of conventional contention based grant-free solutions would have been collapsed already with much smaller uplink traffic load. This simulation study suggests that the present grant-free solution would be applicable for all UL data transmissions at least in the studied environment, i.e. in ultra-dense networks.

Furthermore, any method according to the present invention may be implemented in a computer program, having code means, which when run by processing means causes the processing means to execute the steps of the method. The computer program is included in a computer readable medium of a computer program product. The computer readable medium may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present network node 100 or user device 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors 104 and 304 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A network node for a wireless communication system, the network node comprising:
   a transceiver configured to receive a plurality of reference signals associated with a plurality of user devices; and
   a processor configured to:
      group the plurality of user devices into at least one group of user devices based on the plurality of received reference signals;
      assign radio resources for grant-free data transmission to the group of user devices; and
      compute a receiver filter for the group of user devices based on the plurality of received reference signals and the assigned radio resources,
   wherein the transceiver is further configured to receive a plurality of grant-free data transmissions from user devices in the group of user devices in the assigned radio resources,
   wherein the processor is further configured to separate the grant-free data transmissions from the user devices in the group of user devices based on the computed receiver filter, and
   wherein the processor is further configured to:
      estimate inter-arrival times for data packets in the plurality of received grant-free data transmissions from the user devices in the group of user devices; and
      re-compute the receiver filter for the group of user devices based on the plurality of received reference signals and the estimated inter-arrival times.

2. The network node according to claim 1, wherein the processor is further configured to determine a first control message for at least one user device of the group of user devices, wherein the first control message indicates the assigned radio resources, and
   wherein the transceiver is further configured to transmit the first control message to the user device.

3. The network node according to claim 2, wherein the processor is further configured to determine at least one Modulation and Coding Scheme (MCS) based on the plurality of received reference signals, and wherein the transceiver is further configured to transmit a second control message to the user device, wherein the second control message indicates the MCS to be used by the user device in the grant-free data transmission.

4. The network node according to claim 3, wherein the second control message further indicates a MCS update instruction instructing the user device to update the MCS for the grant-free data transmission.

5. The network node according to claim 3, wherein the second control message further indicates different MCSs to be used by the user device for different radio resources in the grant-free data transmission.

6. The network node according to claim 1, wherein the processor is further configured to:
derive location information for the plurality of user devices based on the plurality of received reference signals; and
group the plurality of user devices based on the derived location information for the plurality of user devices.

7. The network node according to claim 1, wherein the processor is further configured to group at least one user device of the plurality of user devices into at least two different groups of user devices.

8. The network node according to claim 1, wherein the transceiver is further configured to receive a plurality of new reference signals associated with the plurality of user devices, and
wherein the processor is further configured to re-compute the receiver filter for the group of user devices based on the plurality of received new reference signals.

9. The network node according to claim 1, wherein the transceiver is further configured to receive a plurality of new reference signals associated with the plurality of user devices, and
wherein the processor is further configured to re-group the plurality of user devices into at least one new group of user devices based on the plurality of received new reference signals.

10. The network node according to claim 1, wherein assigned radio resources for different groups of user devices are orthogonal to each other.

11. A user device for a wireless communication system, the user device comprising:
a transceiver configured to:
transmit at least one reference signal to a network node;
receive a first control message from the network node, wherein the first control message indicates radio resources for grant-free data transmission;
receive a second control message from the network node, wherein the second control message indicates at least one Modulation and Coding Scheme (MCS) associated with the indicated radio resources; and
transmit data packets to the network node in the indicated radio resources for grant-free data transmission using the indicated MCS,
wherein the second control message further indicates an MCS update instruction instructing the user device to update the MCS for the grant-free data transmission, and
wherein the MCS update instruction instructing the user device to update the MCS is based on the network node computing a receiver filter based on an estimation of inter-arrival times of data packets sent to the network node.

12. The user device according to claim 11,
wherein the transceiver is further configured to transmit data packets to the network node in the indicated radio resources using the updated MCS.

13. The user device according to claim 11, wherein the second control message further indicates different MCSs to be used by the user device for different radio resources in the grant-free data transmission, and
wherein the transceiver is further configured to transmit data packets to the network node in the indicated radio resources using the MCSs for different radio resources.

14. A method comprising:
receiving a plurality of reference signals associated with a plurality of user devices;
grouping the plurality of user devices into at least one group of user devices based on the plurality of received reference signals;
assigning radio resources for grant-free data transmission to the group of user devices;
computing a receiver filter for the group of user devices based on the plurality of received reference signals and the assigned radio resources;
receiving a plurality of grant-free data transmissions from user devices in the group of user devices in the assigned radio resources;
separating the grant-free data transmissions from the user devices in the group of user devices based on the computed receiver filter;
estimating inter-arrival times for data packets in the plurality of received grant-free data transmissions from the user devices in the group of user devices; and
re-computing the receiver filter for the group of user devices based on the plurality of received reference signals and the estimated inter-arrival times.

15. A method comprising:
transmitting at least one reference signal to a network node;
receiving a first control message from the network node, wherein the first control message indicates radio resources for grant-free data transmission;
receiving a second control message from the network node, wherein the second control message indicates at least one MCS associated with the indicated radio resources; and
transmitting data packets to the network node in the indicated radio resources using the indicated MCS,
wherein the second control message further indicates an MCS update instruction instructing the user device to update the MCS for the grant-free data transmission, and
wherein the MCS update instruction instructing the user device to update the MCS is based on the network node computing a receiver filter based on an estimation of inter-arrival times of data packets sent to the network node.

16. A non-transitory computer readable medium with a program code for performing, when the computer program runs on a computer, a method comprising:
receiving a plurality of reference signals associated with a plurality of user devices;
grouping the plurality of user devices into at least one group of user devices based on the plurality of received reference signals;
assigning radio resources for grant-free data transmission to the group of user devices;
computing a receiver filter for the group of user devices based on the plurality of received reference signals and the assigned radio resources;

receiving a plurality of grant-free data transmissions from user devices in the group of user devices in the assigned radio resources;

separating the grant-free data transmissions from the user devices in the group of user devices based on the computed receiver filter;

estimating inter-arrival times for data packets in the plurality of received grant-free data transmissions from the user devices in the group of user devices; and re-computing the receiver filter for the group of user devices based on the plurality of received reference signals and the estimated inter-arrival times.

17. A non-transitory computer readable medium with a program code for performing, when the computer program runs on a computer, a method comprising:

transmitting at least one reference signal to a network node;

receiving a first control message from the network node, wherein the first control message indicates radio resources for grant-free data transmission;

receiving a second control message from the network node, wherein the second control message indicates at least one MCS associated with the indicated radio resources; and transmitting data packets to the network node in the indicated radio resources using the indicated MCS, wherein the second control message further indicates an MCS update instruction instructing the user device to update the MCS for the grant-free data transmission, and wherein the MCS update instruction instructing the user device to update the MCS is based on the network node computing a receiver filter based on an estimation of inter-arrival times of data packets sent to the network node.

* * * * *